United States Patent [19]
Head

[11] 3,813,939
[45] June 4, 1974

[54] TAG-SENSING FLOWMETERS

[75] Inventor: Victor P. Head, Hatboro, Pa.

[73] Assignee: Fischer & Porter Co., Warminster, Pa.

[22] Filed: May 7, 1973

[21] Appl. No.: 357,789

[52] U.S. Cl.......... 73/194 E, 73/194 F, 235/151.34
[51] Int. Cl............................ G01p 5/08, G01p 5/18
[58] Field of Search........... 73/194 F, 194 E, 194 A, 73/194 B; 324/77 G; 235/151.34, 181

[56] References Cited
UNITED STATES PATENTS

| | | | |
|---|---|---|---|
| 3,595,078 | 7/1971 | Beck et al. | 73/194 F |
| 3,635,082 | 1/1972 | Prellwitz et al. | 235/151.34 X |
| 3,762,221 | 10/1973 | Coulthard | 73/194 E |

Primary Examiner—James J. Gill

[57] ABSTRACT

A tag-sensing flowmeter for fluids whice contain spatially-distributed random tags in the form of triboelectric charges, or in any other form that can be detected to produce a corresponding electric signal. The fluid is conducted through a passage having two tag-sensing stations separated by a known distance. The two signals produced at these stations are amplified and algebraically combined to yield a difference signal which is applied to an auto-correlator to ascertain the transit time of the tags between the two stations, thereby to determine the flowrate of the fluid.

11 Claims, 5 Drawing Figures

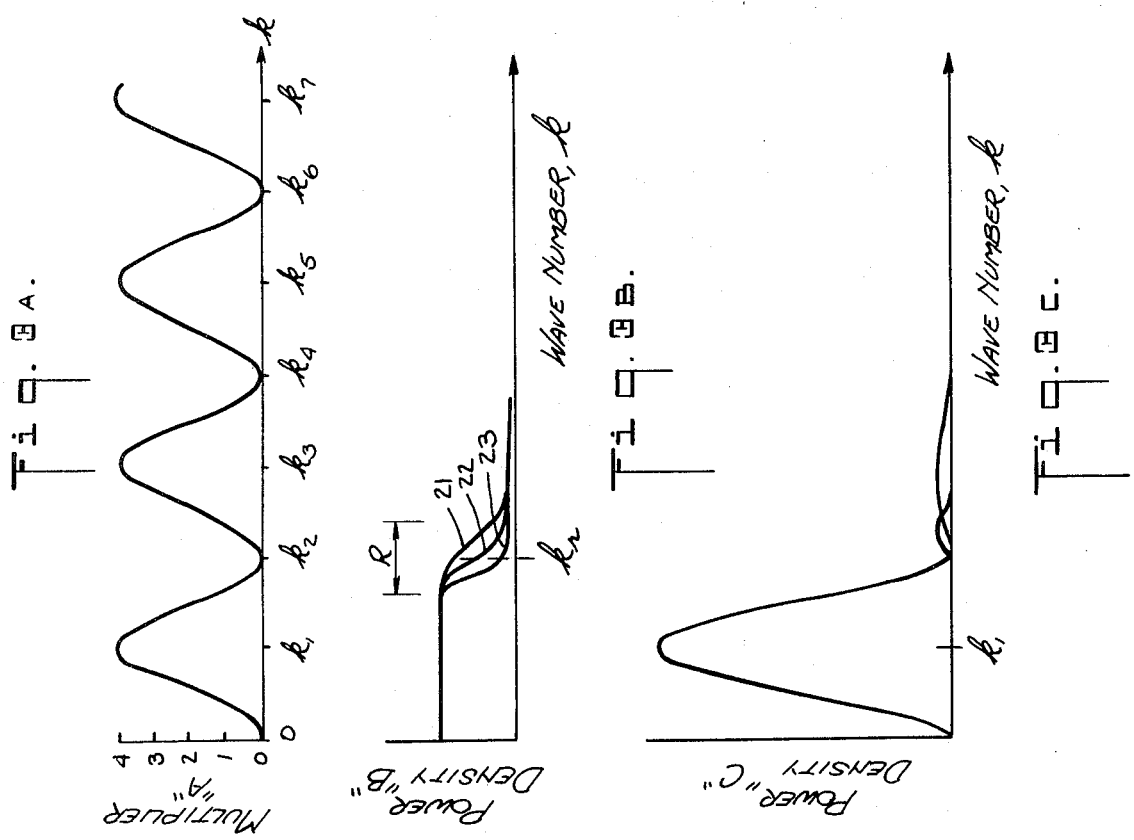
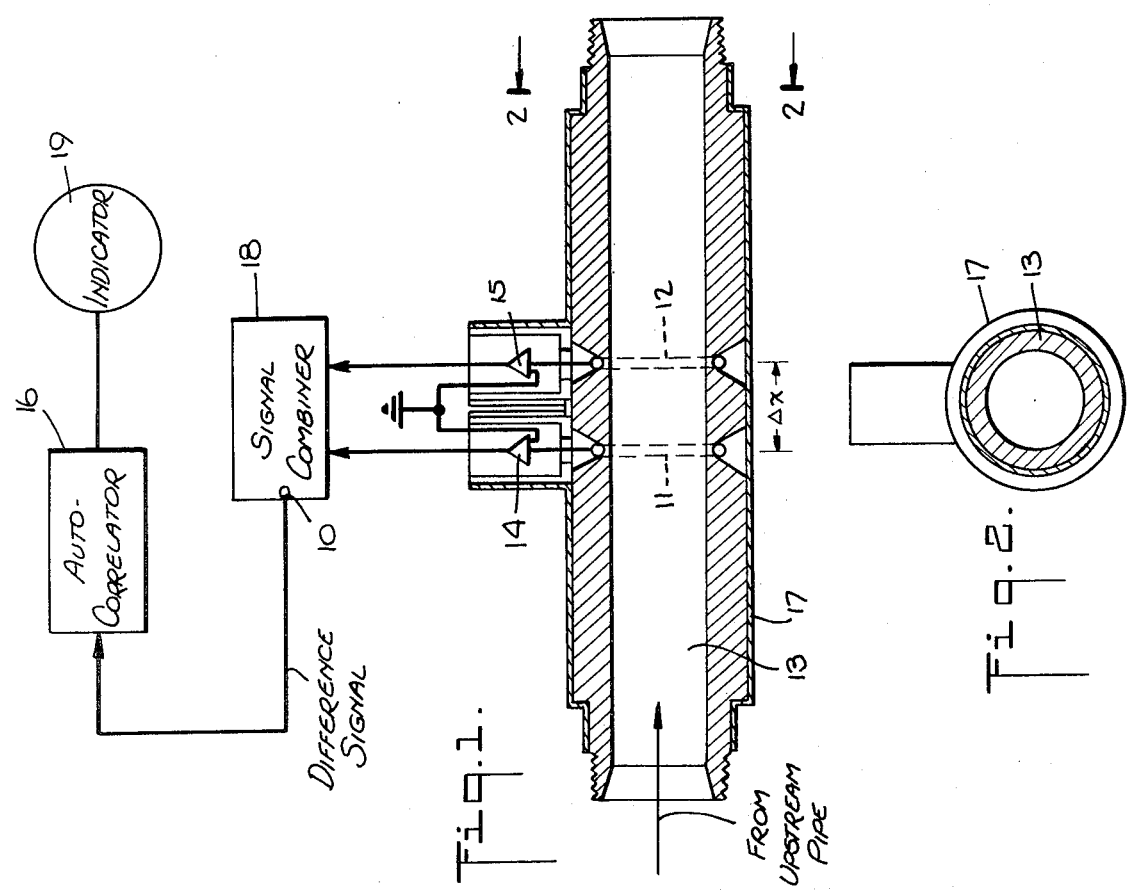

TAG-SENSING FLOWMETERS

BACKGROUND OF THE INVENTION

This invention relates generally to techniques and apparatus for measuring the velocity or volumetric flow rate of a fluid, and more particularly to a flowmeter which senses tags such as triboelectric charges carried by the fluid to produce indications as a function of the transit time of the tags between two sensing points.

In recent years, many new techniques for the measurement of flow have been developed. Thus the magnetic flowmeter was produced to measure volume rates of fluids that present difficult handling problems, such as corrosive acids, sewage, rock slurries, and paper-pulp stock. The magnetic flowmeter is based on Faraday's law of electromagnetic induction, whereby a voltage is induced in the fluid acting as a conductor moving through a magnetic field.

However, magnetic flowmeters are not effective with fluids of very low electrical conductivity, whether in liquid, gas, suspension, or in any other form. Another reason which militates against the use of magnetic flowmeters with certain types of fluids is the presence of severe triboelectric noise which interfers with the induced voltage representing flow rate.

Another approach is that taken in U.S. Pat. No. 3,551,794, wherein a fluid to be measured is tagged by imparting thereto a modulated net magnetization at a tagging station. The magnetization level of the fluid is detected at a detection station located downstream from the tagging station. The purpose of the tagging station is to mark the fluid in such a way that the rate of flow is determined by the time it takes for the tag to arrive at the downstream station.

The idea of determining flow rate by measuring the amount of time a fluid takes to traverse two points having a known spacing therebetween is also found in U.S. Pat. No. 3,595,078, wherein use is made of capacitance transducers placed at positions spaced along a flow tube. Variations in the air-solid mixture flowing through the tube induce changes in the capacitance of the transducers. These changes are converted into signals which are applied to a cross-correlator. This correlator derives the transit time of the fluid over the fixed distance between the transducers, by ascertaining that value of the time delay between the first and second signals for which the cross-correlation function of the two signals has its maximum value.

Inasmuch as the present invention employs auto rather than cross-correlation for a similar purpose, the limitations of cross-correlation are relevant. Correlation is the technique of making clear the degree to which one changing value is dependent on another. Cross-correlation depends for its success on the identification of a unique peak in the cross-correlation function at a signal time delay related to the ratio of the spacing between the sensors which pick up the two signals to be correlated, and the velocity to be measured. Cross-correlation in the context of fluid-flow measurement suffers from the following drawbacks:

a. The sought-for peak of the cross-correlation function is best identified when the bandwidth of the sensed variable approaches infinity, so that this peak then takes the form of a narrow spike centered at the desired time delay. But, in practice, unless extremely small and delicate probes of adequate resolution are immersed within the fluid, the sensed variable has a bandwidth which is far from infinite. As a consequence, the desired cross-correlation peak is broadened to assume the form of a hump or virtual plateau. Hence the greater the degree of spatial periodicity of the sensed variable, the more difficult it becomes to establish the exact value of the time delay.

b. The environment is replete with stray time-variable noises of discrete hum frequencies such as multiples of the existing power line frequency (i.e., 60, 120, 180, etc. Hz) or microphonics arising from mechanical vibration. When the signals from spatially-disposed sensors are contaminated by such noise, it becomes impossible to distinguish between a time-delayed cross-correlation peak indicative of the transit time of the sensed variable, and any of the numerous spurious peaks whose false time delays are indicative of the periods of such noise.

c. Where the sensed variable is of adequately broad bandwidth but is associated with a fluid whose motion comprises continuously-variable steady components of velocity, as in a boundary layer, a wide band of velocity-related time delays may appear as a broad hump in the cross-correlation and thereby render impossible the accurate determination of a single characteristic velocity, such as a maximum or an average.

SUMMARY OF THE INVENTION

In view of the foregoing, it is the main object of the present invention to provide a tag-sensing flowmeter which affords an accurate reading of flow rate, the indication of flow being substantially free from stray effects and being insensitive to the properties of the fluid.

A significant advantage of the invention resides in the fact that because it senses spatially distributed random tags in the fluid being metered, without regard to the nature of the fluid, it is able to measure the velocity or volumetric flow rate of fluids which electromagnetic flowmeters are incapable of measuring, such as fluids having low electrical conductivity.

More specifically, it is an object of this invention to provide a tag-sensing flowmeter for fluids containing spatially distributed, random triboelectric tags that are detectable by two spaced sensor rings, such as toroids, to yield corresponding electric signals which are analyzable to determine the transit time of the tags between the two rings, from which time the flow rate may be determined.

Yet another object of the invention is to provide a flowmeter of the tag-sensing type which is of simple, low-cost design, which involves no moving parts or parts immersed in the fluid, which operates reliably and efficiently without the need for maintenance or recalibration after installation, and which is not wasteful of pumping power.

Briefly stated, these objects are realized in a tag-sensing flowmeter in accordance with the invention wherein the fluid to be metered contains spatially distributed random tags and is conducted through a flow conduit having two tag-sensing stations separated by a known distance. The two signals produced at these stations reflect successive passages of the tags moving at the fluid velocity and are similar except for a time delay. These signals are amplified and algebraically combined to produce a difference signal that is auto-correlated to produce an output from which fluid flow rate may be inferred.

OUTLINE OF THE DRAWING

For a better understanding of the invention as well as other objects and further features thereof, reference is made to the following detailed description to be read in conjunction with the accompanying drawing, wherein:

FIG. 1 is a longitudinal section taken through a tag-sensing flowmeter in accordance with the invention;

FIG. 2 is a transverse section taken in the plane indicated by line 2—2 in FIG. 1, and FIGS. 3A, 3B and 3C are a graphical representations, illustrative of certain spectral relationships.

DESCRIPTION OF THE INVENTION

The present invention is directed to the metering of fluids which contain spatially distributed random tags which may be triboelectric in nature, or in any other form that lends itself to detection to produce a corresponding electrical signal. For example, tags which are radioactive may be sensed by solid-state radioactive detectors and turbulence tags may be picked up by pressure or temperature detectors. For purposes of illustration, we shall hereinafter consider only triboelectric tags, for these are encountered in many fluids of low conductivity.

Given a fluid in motion and carrying random tags constituted by electric charges of any origin from a source up-stream of a velocity or flow-measuring station, the following methods may be employed to sense the variable potential associated with the electric field produced by the charges, and to infer flow rate therefrom.

A. A steady, average, or D-C signal may be derived by sensing the electric field at a given point or between two points where the average field potentials may be expected to differ under essentially stationary conditions of fluid charge density. The sensed signal can be processed to generate a voltage, current or other signal variable indicative of the average difference in the field potentials, and hence of the average charge concentration in the fluid at the measuring station. The signal variations then reflect variations of charge concentration associated with velocity-dependent upstream triboelectric charge generation.

In this D-C technique, the relation of signal to flow rate is heavily dependent on the triboelectric and the conductive properties of both the fluid and the upstream apparatus. Moreover, the response time will be sluggish, of the order of the dwell time of the fluid in the upstream apparatus. Also, the signal is liable to drift because of polarization effects, the slow conductive redistribution of charge in any apparatus employed, or because of unwanted thermocouple effects in the circuits and other D-C stray voltages or currents.

The usefulness of this D-C method is therefore limited to applications where slow-response speed flowmeters of low accuracy are acceptable, as for example, where it is desired only to actuate an alarm or safety valve when a gross change in flow rate is encountered.

B. A ripple or A-C variation in the electric field may be sensed, and its amplitude may be reflected in a processed signal used as in method A. This A-C method reduces the sensitivity of the meter to variables other than flow rate and gives rise to a considerable increase in response speed. However, this A-C method is still unpredictable and is suitable only for applications where low accuracy and the need for calibration after installation, are acceptable.

C. The ripple or A-C variation at a given point in the field may be sensed so that individual pulses of the signal may be counted to display a cumulative count which over long periods of continued flow, may be used for flow totalization. However, the statistical nature of such a signal produces large statistical deviations in volume per pulse, thereby rendering short term totalization highly inaccurate and rate indication virtually impossible.

The use of the characteristic spectral frequency of an A-C signal from a single tag sensor makes possible calibration prior to installation, as well as substantial freedom from installation conditions. Because of the distinct advantages gained by sensing the spectrum of the A-C variations resulting from the random tags in the fluid, it is this A-C spectrum technique which is employed in the present invention, and the discussion to follow will be concerned only with this technique. However, the spectrum of the signal from a single sensor may be adversely influenced by fluid properties as well as by stray hum.

The A-C variations may be sensed at two stations separated by a predetermined distance along a flow conduit. The time delay between correlatable characteristics of the signals sensed at the two stations may then be measured and interpreted as the transit time or "time-of-flight" of the fluid carrying an irregular spatial distribution of charges. In this way, the flow rate versus time delay is amenable to theoretical analysis, thereby obviating the need for flow calibration.

One method to determine the transit time and to derive the flow rate from this value is to cross-correlate the signals to ascertain the time delay for which the cross-correlation is a maximum. But cross-correlation, as indicated in the Background Section, suffers from several practical disadvantages.

In accordance with the present invention, the signals sensed at the two spaced stations in the fluid passage are algebraically combined so as to develop a single difference signal which is auto-correlated to yield a time delay associated with the first zero crossing of the auto-correlation function. The first zero crossing has been found to be especially useful in that the time delay measured by this crossing is essentially equal to one-half of the transit time in question, or to one-quarter of that period which is the reciprocal of the dominant spectrum frequency of the difference signal. This dominant frequency is directly proportional to flow velocity and inversely proportional to the spacing between stations.

In this way, the ill-defined peak which is obtained by cross-correlating the two signals is discarded in favor of an extremely sharp first-zero crossing obtained by auto-correlating a single signal, which preferably is the difference signal of the two signals sensed at the two stations. By proper choice of the spacing between the two stations, the spectrum of the single difference signal can be rendered effectively immune to installation conditions and fluid viscosity.

In a preferred embodiment of the invention, as disclosed in FIGS. 1 and 2, a single A-C difference signal is derived at terminal 10 from random tags sensed at two stations, generally designated by numerals 11 and 12. These stations are separated by a fixed and known distance, along a flow tube 13 through which the fluid to be metered is conducted. Sensors 11 and 12 are preferably in the form of toroidal rings completely encircling the flow tube so as to entirely suppress the influence of transverse turbulent velocity components.

The output of sensor 11 is amplified by amplifier 14, and that of sensor 12, by amplifier 15, the two outputs being combined algebraically by combiner 18 to produce a difference signal at terminal 10. The difference signal is applied to an auto-correlator 16, from which velocity or flowrate is inferred.

With respect to the A-C and D-C triboelectric signal strength, the sensed differences in field potential may range from microvolts to kilovolts. In the case of charges originating from a highly conductive upstream metal pipe, the field may not only be weak, but wholly confined within the fluid.

As to charges originating from a poorly conductive upstream pipe such as a neoprene hose, the level of charge generation may be higher but the field potentials are still weak, especially outside of the hose. It has been discovered that the charge level may be enhanced appreciably while weakening or extinguishing the external field, if a substantial upstream length of the low-conductivity pipe or hose is coated with a conductive layer, such as metallic foil or conductive paint or one may for the same purpose employ commercially available neoprene hose of the type which incorporates a helical wire as a pressure-reinforcing expedient.

It has also been found that the triboelectric signals sensed outside the flow tube may be considerably increased if flow tube 13, which is a relatively short length of conduit, is fabricated of a material whose conductivity is much lower than that of the material of the upstream pipe to which it is coupled and this conduit is surrounded by a metallic shield or housing 17 whose internal diameter is significantly larger than that of the upstream pipe and flow tube inlet and exit portions, as shown in FIGS. 1 and 2.

This increase in signal strength may be understood by likening the charged fluid in the upstream pipe to one plate of a capacitor whose other plate is the grounded, conductive upstream pipe through which the fluid flows. When the fluid passes from the upstream pipe to the inlet of flow tube 13 into the region of the enlarge shield 17, it is as if the plates of the charged condenser were suddenly spread apart. This action gives rise to a sharp increase in the potential difference between the plates without any change in the charge. Similarly, a strong electric field is formed between the charged fluid and the shield, which may be sensed by electrode sensors 11 and 12 without the need for placing the sensors in the fluid.

The graphs in FIG. 3 illustrate the transformation of the spectrum of the signal from a single sensor station 11 or 12 into a difference-signal spectrum. FIG. 3(a) is a graph of the power-spectrum multiplier "A" which is readily derived from phase considerations for the correlatable portions of the separate signals from the two stations:

$$A = 2 - 2 \cos (2\pi k \Delta x)$$

where $k$ is wave number or spatial frequency in cycles per unit axial distance along the flow tube axis with respect to which the spatial distribution of random tags in the column of moving fluid may be presented as a spatial spectrum. The correlatable portions of the two signals delivered to the signal combiner 18 are those portions which are identical except for the tag transit time associated with the motion of the fluid at velocity U over the distance $\Delta x$ between sensor stations.

The wave number $k$ is a more convenient spectrum parameter than frequency $f$ because variations in the nature of the wave number spectrum are primarily associated with spatial resolution of the sensors, viscosity effects, and upstream installation influences on the tag distribution, while a frequency spectrum would combine these effects with the dominant influence of the flow velocity $U$ since, for any spectrum component, $f = kU$.

The graph (a) is wholly independent of the nature of the correlatable single-sensor signal spectrum which it may modify. It is seen to consist of a first peak which coincides with the unique wave number $k_1 = 1/(2 \Delta x)$ and the subsequent peaks $k_3$, $k_5$, $k_7$ etc. located at all odd multiples of $k_1$, these peaks having one value of the multiplier "A" equal to 4, and alternating with valleys, where the power multiplier "A" is zero, located at $k_2$, $k_4$, $k_6$ etc. corresponding to all even multiples of $k_1$.

It will now be apparent how experimental knowledge of the power density spectrum and its variations with Reynolds number and installation influences permit one to select a desirable spacing $\Delta x$ for the sensor stations. FIG. 3 (b) shows representative experimental single-sensor spectra which are seen to exhibit major variations shown by curves 21, 22, 23, limited to the roll-off band R, centered at a wave number $K_r$. One therefore chooses a sensor station spacing $\Delta x$ equal to the reciprocal of the experimentally determined roll-off band center $k_r$, placing $k_1$ in a spectral zone where the influences of viscosity and installation are seen to be minimal.

As shown in FIG. 3 (c), the output of signal combiner 18 is a difference signal having power density "C" versus wave number $k$ calculated by multiplying the raw power densities "B" by the power multipliers "A." The spectrum of FIG. 3 (c) is seen to be very narrow and highly symmetrical, with negligible power in the band R where the major unwanted effects of viscosity and installation were concentrated. This spectrum is therefore ideal for auto-correlation.

In addition to the correlatable portions of signals illustrated in FIG. 3, there are very broad-band and statistically independent signal portions associated with the signals from sensor stations 11 and 12. Their power is not treated in accordance with the graph FIG. 3 (a) but rather is added, together with any broad-band thermal noise originating in the amplifiers 14 and 15. It is the function of the auto-correlator 16 to reject the influence of broad-band noise, which is reflected in an increase in the peak value of the auto-correlation function at zero time delay, leaving the value of time delay at the first zero crossing of the autocorrelation function essentially equal to one-half of the time of transit of the tags carried by the fluid from station 11 to staiton 12 at the flow velocity U.

Thus the use of the two sensor stations 11 and 12 and the signal combiner 18 has the advantage of greatly reducing viscosity and installation effects. Another advantage of this method relates to unwanted environmental hum frequencies contaminating the individual station signals. Insofar as these hums are of equal amplitude and phase, they are rejected by the signal combiner 18 and so have no influence on the output function of the autocorrelator 16.

The auto-correlation function obtained by auto-correlator 16 is applied to a suitable indicator 19, calibrated in terms of flowrate. In practice, the auto-correlation function (auto-correlation vs. time delay) may be stored in the memory of a computer in a manner whereby it is, at frequent intervals, updated in response to the difference signals yielded by the flowmeter.

This memory is scanned over the range from zero time delay (where the auto-correlation always exhibits a large positive value) to that time delay where the auto-correlation first crosses from a positive to a negative value, and then, disregarding all larger values of the time delay, the scan is again started from zero delay. This scanning is done repeatedly so as to generate a frequency which is any desired fraction or multiple of the reciprocal of the time delay.

One may, for example, employ a constant scanning rate such that the ratio of any small interval of scanning time to the corresponding increment of time delay is any convenient value. If this ratio is chosen to be unity, then the scanned output will consist of a series of positive pulses whose repetition rate is four times the dominant spectral frequency and hence is proportional to flow. An advantage of this procedure is that each pulse of the scanned output may be identified with a particular fluid volume for purposes of flow totalization, while rate may be displayed on a suitable frequency meter.

While there have been disclosed preferred embodiments of the invention, it will be appreciated that many changes may be made therein without departing from the essential spirit of the invention. Thus the sensed variable may, for example, consist of a random fluctuation of temperature or pressure, or a fluctuation in a transmission property of the fluid with respect to an optical or acoustic beam. One may, for instance, sense turbulence tags by means of ultrasonic beams projected into the fluid at spaced tag-sensing stations. These tags and many other forms of random fluid tags, are amenable to detection at spaced stations to yield a difference signal having a frequency spectrum uniquely related to the station spacing and the flow velocity. Where suitable tags are absent, one may create such tags by introducing them at a point upstream of the flow tube and by controlling their spectral characteristics, as with a pseudo-random generator.

I claim:

1. A tag-sensing flowmeter for fluids containing spatially distributed random tags that are detectable to produce corresponding electrical signals, said flowmeter comprising:
   A. a flow tube adapted to be coupled to an upstream pipe conducting the fluid thereto;
   B. a pair of tag-sensing probes fixedly mounted at points disposed along said tube having a predetermined distance therebetween in the direction of flow, said probes sensing the tags to yield A-C signals that are similar except for a time delay which varies as a function of fluid flow rate;
   C. means algebraically to combine the signals yielded by the probes to produce a difference signal; and
   D. an auto-correlator responsive to said difference signal to infer the flow rate therefrom.

2. A flowmeter as set forth in claim 1, wherein said tags are triboelectric charges and said probes are constituted by means responsive to such charges.

3. A flowmeter as set forth in claim 1, wherein said tags consist of random fluctuations in temperature, and said probes are constituted by means responsive to such fluctuations.

4. A flowmeter as set forth in claim 1, wherein said tags consist of random fluctuations in pressure and said probes are constituted by means responsive to such fluctuations.

5. A flowmeter as set forth in claim 1, wherein said tags consist of fluctuations in a transmission property of said fluid and said probes are constituted by means to radiate an energy beam responsive to such fluctuations.

6. A flowmeter as set forth in claim 2, wherein said probes are formed by rings through which the fluid passes.

7. A flowmeter as set forth in claim 1, wherein said auto-correlator yields any one of several time delays associated with various peaks and zero crossings of the auto-correlation function, the first zero crossing being extracted to determine the time delay associated therewith.

8. A flowmeter as set forth in claim 2, wherein said pipe is made of conductive material and said tube is made of non-conductive material.

9. A flowmeter as set forth in claim 8, wherein said tube is surrounded by a metal shield whose internal diameter is substantially larger than that of the pipe.

10. A flowmeter as set forth in claim 1, further including an indicator calibrated in terms of flow rate coupled to the output of said auto-correlator.

11. A flowmeter as set forth in claim 1, further including a counter coupled to said auto-correlator and calibrated in terms of fluid volume discharged.

* * * * *